(12) United States Patent
Jung

(10) Patent No.: US 6,805,797 B1
(45) Date of Patent: Oct. 19, 2004

(54) METHOD OF TREATING INCINERATION ASHES WITH SULFATE REDUCING BACTERIA

(76) Inventor: Kweon Jung, #1316-1601, Tongbak Apt., Sanbon-dong, Kunpo-shi, Kyonggi-do 435-040 (KR)

( * ) Notice: Subject to any disclaimer, the term of this patent is extended or adjusted under 35 U.S.C. 154(b) by 9 days.

(21) Appl. No.: 10/049,824

(22) PCT Filed: Aug. 18, 2000

(86) PCT No.: PCT/KR00/00922
§ 371 (c)(1),
(2), (4) Date: Feb. 19, 2002

(87) PCT Pub. No.: WO01/14261
PCT Pub. Date: Mar. 1, 2001

(30) Foreign Application Priority Data

Aug. 19, 1999 (KR) .......................................... 1999/34333

(51) Int. Cl.[7] .................................................. C02F 3/00
(52) U.S. Cl. ...................................... 210/610; 210/611
(58) Field of Search ................................ 210/610, 611, 210/601, 751, 757, 912

(56) References Cited

U.S. PATENT DOCUMENTS

| | | | |
|---|---|---|---|
| 4,354,937 A | 10/1982 | Hallberg | |
| 4,522,723 A | 6/1985 | Kauffman et al. | |
| 4,973,194 A | * 11/1990 | Peterson | .............. 405/129.35 |
| 5,645,730 A | * 7/1997 | Malachosky et al. | ....... 210/665 |

FOREIGN PATENT DOCUMENTS

| | | | |
|---|---|---|---|
| JP | 52056073 A | * 5/1977 | .............. B01J/1/00 |
| KR | 1998-67148 A | 10/1998 | |
| WO | 95/22375 A1 | 8/1995 | |

* cited by examiner

*Primary Examiner*—Chester T Barry
(74) *Attorney, Agent, or Firm*—Birch, Stewart, Kolasch & Birch, LLP (57) ABSTRACT

A method of treating incineration ash and wastewater sludge, wherein a mutual relation in using nutrients exists between the incineration ash containing heavy metal and organic wastes containing the wastewater sludge and sulfate-reducing bacteria, including the steps of burying the incineration ash together with the organic wastes under the ground, whereby the bacteria reduces the sulfates existing in the incineration ash to form sulfides, binding the formed sulfides with the heavy metal to form insoluble metal sulfides, thereby preventing the heavy metal from exuding out of the incineration ash as and eluate.

8 Claims, 8 Drawing Sheets

$$2CH_3CH(OH)COO^- + H_2SO_4 \longrightarrow 2CH_3COO^- + 2CO_2 + H_2S + 2H_2O$$

$$SO_4^{2-} + 2(CH_2O) + 2H^+ \longrightarrow H_2S + 2CO_2 + 2H_2O$$

$2CH_3CH(OH)COO^- + H_2SO_4 \longrightarrow 2CH_3COO^- + 2CO_2 + H_2S + 2H_2O$ $SO_4^{2-} + 2(CH_2O) + 2H^+ \longrightarrow H_2S + 2CO_2 + 2H_2O$

Leachate From The Incineration Ash (81)

Leachate From The City Trash (83)

Leachate From Sewage Sludge (82)

METHOD OF TREATING INCINERATION ASHES WITH SULFATE REDUCING BACTERIA

This application is the national phase under 35 U.S.C. §371 of PCT International Application No. PCT/KR00/00922 which has an International filing date of Aug. 18, 2000, which designated the United States of America and was published in English.

TECHNICAL FIELD

The present invention relates to a method of treating the incineration ash containing the heavy metal and the wastewater sludge, and more particularly, to a method comprising the steps of making the heavy metals existing in the incineration ashes insoluable, stabilizing the organic materials and separating from the ashes, and burying them in the conventional structure used for burying the plants. And such process is based on the reasonable plan considering the mutual relations between the properties.

BACKGROUND ART

The method of disposing the solid wastes recently causes an additional problem of city life since the method depends mainly on burying them under the ground. However, it is scarcely possible to secure a vast area of ground enough to bury the wastes even in the countries having the small territory in area such as Korea. Therefore, as an alternative plan, a method of treating the wastes by combusting them has been proposed for extending the effective life of the ground to bury in.

In case that the wastes are incinerated and buried in the ground, an advantage that the effective life of landfill may be extended by reducing the volume of trash to be buried may be achieved.

Generally, there have been proposed two types of methods of treating the incineration ash, one of which is the conventional solidification method carried out by mixing the solidifier and the incineration ash together with the additional water in a mixer, and then solidifying the mixture. And a chemical method of solid stabilization by adding a certain chemical agent to the incineration ash to stabilize the heavy metals existing in the ash.

However, the conventional solidification method has several defects as follows:

1) The effect of reducing the volume of incineration ash is not significant, 2) since the heavy metal in the cement may be eluded out depending pH value, the possibility of elution of the heavy metal is great, and 3) the cost for treatment is also high. The chemical method also has the defects that: 1) the expensive chemicals (chelating agents) should be used; 2) another possible problem causing another contamination may be caused due to using those chemicals (chelating agents); and 3) the possibility of elution of the heavy metal depending on pH is still high.

Figure 1:
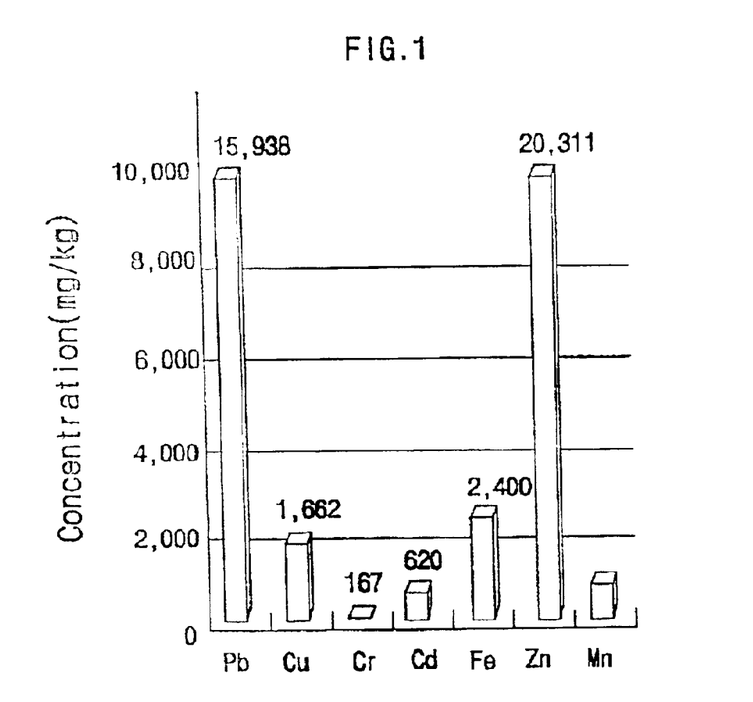
FIG. 1 shows the amount of heavy metals contained in the incineration ash.
Figure 2:
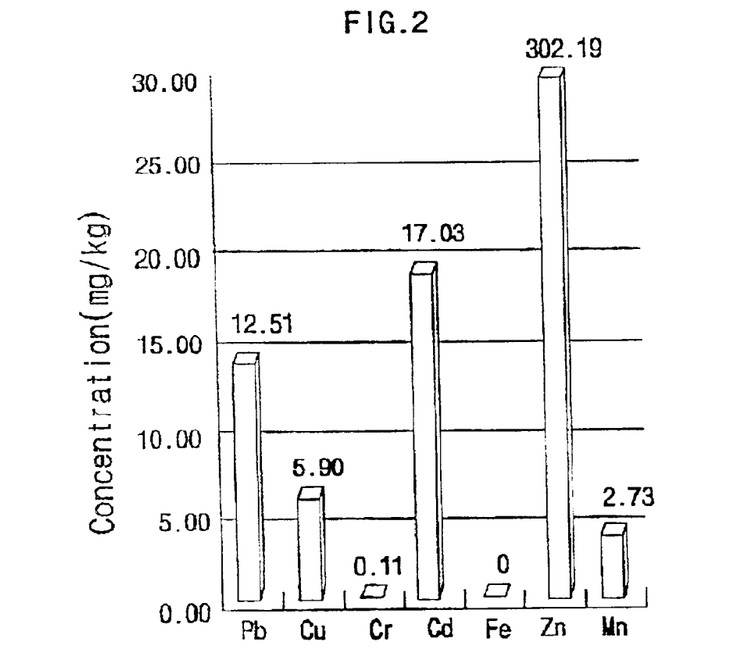
FIG. 2 shows the amount of heavy metals eluate exuding out of the incineration ash.

It is shown in the FIGS. 1 and 2 attached herein that the defects of the prior art, depict the amount of heavy metal contained in the incineration ash and the amount of elution, respectively. And FIG. 2 shows the result of elution test carried out by TCLP method.

FIG. 1 shows the amount of total contents of heavy metal, which the heavy metal contained in the incineration ash comprises 15.936 mg/kg of Pb, 620 mg/kg of Cd, 1.662 mg/kg of Cu, 20.311 mg/kg of Zn and so forth, which is relatively great amount.

Furthermore, as a result of analyzing the elements of incineration ash, it was detected that the incineration ash contained little nitrogen (N) and up to 3.997% of sulfur.

FIG. 2 shows the amount of elution of heavy metal, which the heavy metal eluded from the incineration ash comprises 12.51 mg/l of Pb, 17.03 mg/l of Cd, 5.90 mg/l of Cu, 302.19 mg/l of Zn etc., which significantly exceeds the current standard allowed by the government.

As mentioned above, a little amounts of heavy metals incinerated is not essentially removed from the ash during the incineration process but it is just being concentrated and still existing in the incinerated ash (as being the fly ash as well as the ash lain on the bottom). And if entrapped by the dust collector, its concentration becomes much higher than that has not gone through the incineration. The heavy metals contained in the fly ash and the ash lain on the bottom may be eluded by the rain water when filled in the landfill, and become the leachate, which may cause the secondary contamination of soil and underground water Therefore, a suitable control and/or treatment are required in order to avoid such contamination.

DISCLOSURE OF INVENTION

It is therefore the object of the present invention to provide an essential method for treatment of the incineration ash, which may solve above problems The present invention provides a method of treating the incineration ash and the wastewater sludge (hereinafter, called as "incineration ash"), both of which contain a certain amounts of heavy metals, which comprises the steps of converting the heavy metals contained in the incineration ash into an insoluble state, using a safe manner, in order to prevent the exuding of the heavy metals from the incineration ash outwardly when eluded.

The present invention also provides a method for treatment of the incineration ash by burying together with together with organic wastes, which comprises treating the incineration ash with sulfate-reducing bacteria, which may be provided by the organic wastes containing the sulfate-reducing bacteria.

To accomplish above object, the present invention provides a method for treatment of the incineration ash and the wastewater sludge, wherein a mutual relations in using nutrients exists between the incineration ash containing the heavy metal and the organic wastes containing the wastewater sludge and sulfate-reducing bacteria, which comprises: burying the incineration ash together with the organic wastes under the ground, in which the bacteria reduce the sulfates existing in the incineration ash to form the sulfides, and binding the formed sulfides with the heavy metal to form the insoluble metal sulfides, in order to prevent the heavy metal from exuding out of the incineration ash as eluate.

The present invention also provides a method for treatment of the incineration ash and the wastewater sludge, comprising: burying the incineration ash together with the organic wastes containing the sulfate-reducing bacteria under the ground, and covering them with a depth of soil, so that the said sulfate-reducing bacteria promote the heavy metal to precipitate in the form of insoluble metal sulfides, in order to prevent the heavy metal from exuding out of the incineration ash as eluate.

The present invention further provides a method for treatment of the incineration ash and the wastewater sludge, which comprises: collecting and mixing the aqueous eluate exuding out of the incineration ash and the aqueous eluate exuding out of the organic waste containing the said sulfate-reducing bacteria in a disposal plant, and reacting both the aqueous eluates so that the said sulfate-reducing bacteria existing in the aqueous eluate exuding out of the organic waste deposits the heavy metals from the aqueous eluate exuding out of the incineration ash as the insoluble metal sulfides, resulting in the disposal of the aqueous eluate exuding out of the incineration ash and the aqueous eluate exuding out of the organic waste.

Furthermore, according to an aspect of the invention, the said organic wastes may comprise the sewage sludge containing the said sulfate-reducing bacteria.

The present invention will be described hereinafter by referring to attached drawings.

The present invention provides a method for treatment of the incineration ash and the wastewater sludge, which is carried out by reducing the large amount of sulfates in the inclination ash into the sulfides, binding the sulfides with the heavy metals from the inclination ash, and precipitating and removing the insoluble metal sulfides as formed.

Figure 3:
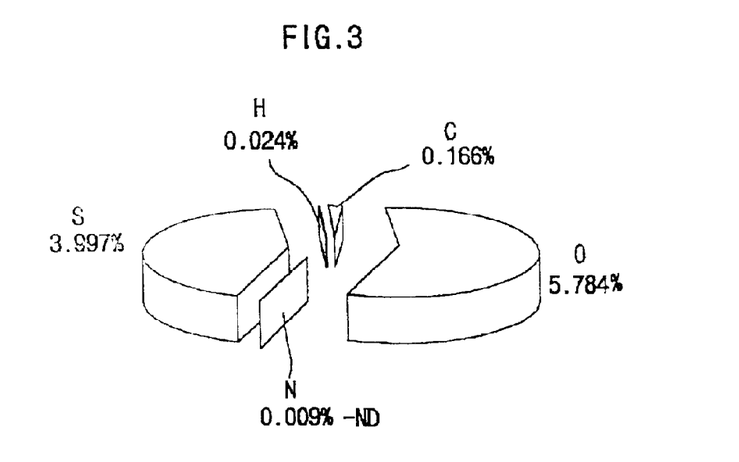
FIG. 3 shows the result of analysis for the elements of the incineration ash by use of element analyzer.

FIG. 3 shows the result of analysis for the elements of the incineration ash by use of element analyzer. As seen from the FIG. 3, a large amount of sulfur element exists in the incineration ash.

The element sulfur binds with oxygen in the incineration ash, and exists in the form of sulfate ($SO_4^{-2}$) in the solution containing the incineration ash.

The mechanism of binding the heavy metal with sulfur in the incineration ash by the sulfate-reducing bacteria will be explained hereinafter referring to FIG. 4.

Figure 4:
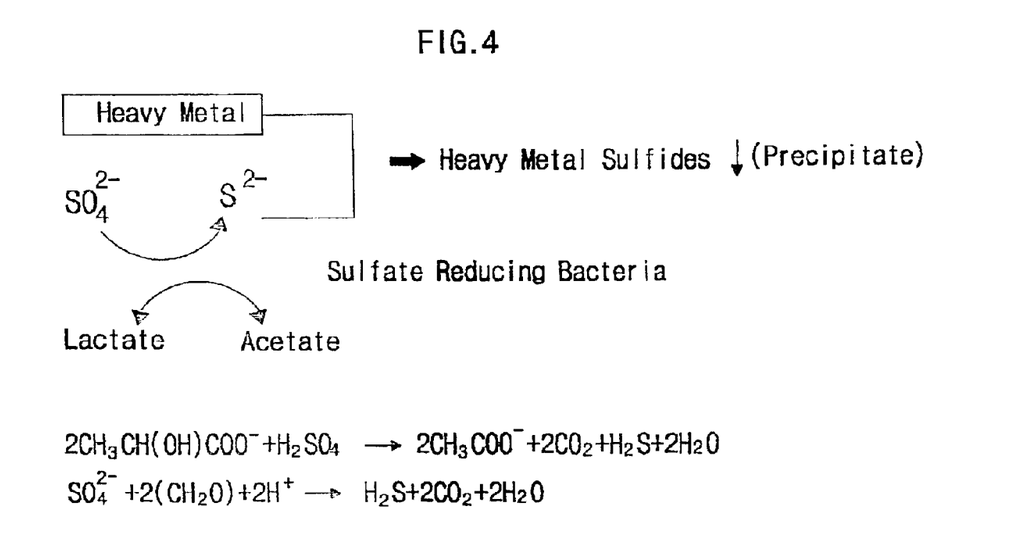
FIG. 4 shows the schematic pathway of the sulfates to be reduced into the sulfides by the sulfate-reducing bacteria.

FIG. 4 shows the pathway through which the sulfate ($SO_4^{-2}$) is to be reduced into sulfides ($S^{-2}$) by the sulfate-reducing bacteria.

The sulfate ($SO_4^{-2}$) in the incineration ash is reduced to the sulfides ($S^{-2}$) by the sulfate-reducing bacteria, and the sulfides bind to the elemental heavy metal to form the precipitate including the insoluble metal sulfides.

In general, the sulfate-reducing bacterium is a kind of anaerobic bacterium, and produces the energy by utilizing lactic acids, resulting in the formation of acetic acid and so forth as the metabolic products. According to this manner, the sulfate-reducing bacteria reduce the sulfates through the anabolic pathway for decomposition of organic compounds.

Furthermore, the sulfate-reducing bacteria can also decompose fatty acids such as palmitic acid as well as the aromatic compounds such as benzoic acid or phenol.

A variety of the sulfate-reducing bacteria existing in the ecosystem on earth require a large amount of energy for decomposing the stable salt such as sulfate ($SO_4^{-2}$), and take its role as the final decomposer of the organic compounds likely the methane bacterium in the ecosystem.

In other words, the sulfate-reducing bacteria reduce the sulfate ($SO_4^{-2}$) as being the inorganic compound, which acts as the electron receptor under the anaerobic condition in the biological environment, to the sulfides ($S^{-2}$, HS or $H_2S$), wherein the organic compounds as being used as the electron donor are oxidized. And, the formed sulfides ($S^{-2}$, HS or $H_2S$) and the heavy metal in the incineration ash bind together due to having the attraction between them, and precipitated.

Since the metal sulfides formed during the process of reducing sulfates are very stable due to having the solubility significantly lower than metal oxides, metal hydroxides or metal carboates, there is no risk of re-elution. Most heavy metals can form the metal sulfides through the reaction with sulfates under the general anaerobic condition. In particular, even Mn, Zn and Al and so forth, which hardly precipitates as the forms of hydroxides or carboates, may react with the sulfides, to form a stable compound and to be stabilized.

The heavy metals may exist in the form of salts or simple substances in the landfills of trash or wastes. The heavy metals existing as the dissolved form in the landfills of trash 4or wastes may move as the ionic state, and such pathway for the heavy metal to be insolubilized may be called to comprise the steps of adsorption and precipitation. The adsorbed heavy metals can move again when the adsorption reaches the saturation point or the adsorbents are decomposed. Therefore, it may be mentioned that the final insolubilization of heavy metals in the landfill is mainly carried out by the precipitation.

The metal sulfides formed by binding sulfides and heavy metals may be the stable compounds in the solid form, unless being affected by the external condition such as aerobic environment or low pH value. The reason is that since the solubility of metal sulfides is extremely low, the heavy metal scarcely eluded from the metal sulfides. In the meantime, the landfills filled with the trash and/or wastes usually provide the anaerobic or almost anaerobic condition and pH ranging from 6 to 10. Therefore, once the metal sulfides formed, they are not re-eluded.

The solubility products of metal sulfides at 25° C. are provided in Table 1 as shown below:

TABLE 1

| Metal Sulfides | $K_{sp}$ |
| --- | --- |
| $Ag_2S$ | $6.3 \times 10^{-50}$ |
| CdS | $8.0 \times 10^{-27}$ |
| CoS | $4.0 \times 10^{-21}$ |
| CuS | $6.0 \times 10^{-36}$ |
| FeS | $6.0 \times 10^{-18}$ |
| HgS | $1.6 \times 10^{-52}$ |
| MnS | $2.5 \times 10^{-10}$ |
| NiS | $3.0 \times 10^{-19}$ |
| PbS | $2.5 \times 10^{-50}$ |
| SnS | $1.0 \times 10^{-25}$ |
| ZnS | $1.1 \times 10^{-21}$ |

As seen from Table 1, it is found that most of all metal sulfides remain as the almost stable compounds in solid form, and the elution occurs only in extremely few cases.

Figure 5:
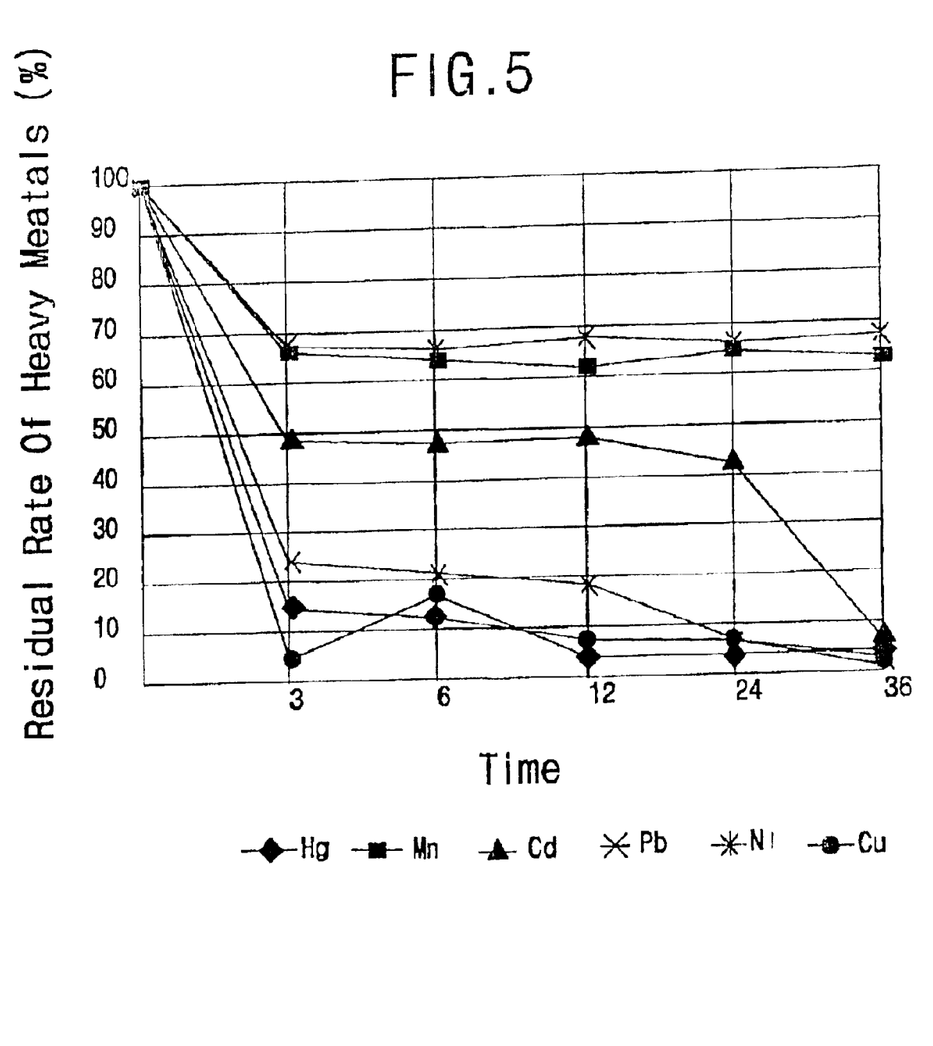
FIG. 5 shows the insolubility of heavy metals caused by the sulfate-reducing bacteria.

FIG. 5 shows the insolubility of heavy metals caused by the sulfate-reducing bacteria. The initial concentrations of the heavy metal were set as follows: 20 mg/l of Hg, 10 mg/l of Cd, 10 mg/l of Pb, 10 mg/l of Ni, 5 mg/l of Cu and 10 mg/l of Mn According to the result of experiment, within a quarter of a day, more than 50% amounts of most heavy metal was removed by the sulfate-reducing bacteria, and in particular, in case of heavy metals such as Cu, Hg, Pb or Cd, 99% or more amounts of heavy metals were removed.

The result of experiment shows that the heavy metals contained in the incineration ash can be insolubilized by precipitating them as metal sulfides. As a result, it is expected that the possible contamination of soil and underground water due to the elution of heavy metal in the treatment of incineration ash can significantly be decreased.

The present invention uses the sulfate-reducing bacteria in order to solidify the harmful heavy metal contained in the incineration ash into the precipitates in the stable form of metal sulfides. In this regard, since like the most of organism, the sulfate-reducing bacteria also use the energy, which has been obtained during the anabolism such as the decomposition of organic compounds, a certain organic material should also be provided in order to utilize the metabolism of the sulfate-reducing bacteria. Since the sulfate-reducing bacteria use the various organic compounds as the carbon source, they are in the advantageous position relative to the other microorganisms in an aspect of competition for securing the organic compounds.

Since the sulfate-reducing bacteria is an anaerobic or at least almost anaerobic microorganism, an anaerobic or at least almost anaerobic condition should be provided for the sulfate-reducing bacteria to grow in the said environment. As a matter of fact, the sulfate-reducing bacteria may be distributed to a high density in an organic waste in which an anaerobic condition of ecological environment has been set up.

The representative examples of the organic waste in which the sulfate-reducing bacteria exist include the sewage sludge, the drainage sludge, the dirty riverbed sludge and so forth (hereinafter, called as "sewage sludge").

The reason for the sulfate-reducing bacteria to exist in the sewage sludge to a high density is the anaerobic condition provided by the sewage sludge as well as the sufficient amount of organic compounds contained in the sewage sludge, which the sulfate-reducing bacteria decompose in order to obtain the energy.

Table 2 was provided to explain the latest fact, in which the result of analyzing elements sampled from the sewage sludge obtained from the various sewage disposal plants.

TABLE 2

| Sludge sampled from | C(%) | H(%) | N(%) | S(%) |
|---|---|---|---|---|
| Nanji septic plant | 42.838 | 6.118 | 4.176 | 0.944 |
| Nanji sewage 1 | 18.082 | 3.131 | 2.622 | 1.295 |
| Nanji sewage 2 | 19.376 | 3.177 | 3.055 | 1.172 |
| Kayang sewage 1 | 18.532 | 3.797 | 3.052 | 1.172 |
| Kayang sewage 2 | 20.177 | 3.797 | 3.052 | 1.430 |
| Kayang septic plant | 45.443 | 6.476 | 4.955 | 0.000 |
| Jungryang sewage 1 | 27.491 | 4.223 | 3.320 | 1.588 |
| Jungryang sewage 2 | 17.858 | 2.713 | 2.458 | 1.133 |
| Tan-Stream A | 20.729 | 3.578 | 3.231 | 1.258 |
| Tan-Stream (mixed) | 20.472 | 3.633 | 3.077 | 1.270 |

As seen from Table 2, when seeing the resulting data of analyzing elements sampled from the sewage sludge, it was found that relatively large amount of carbon element (17 to 45%) and nitrogen (2.5 to 5.0%) were contained in the sludge. Furthermore, although not provided to Table 2, the amount of contents as well as that of eluent of heavy metal is very low in the sewage sludge. Therefore, it may be found that the sewage sludge has the condition for growing the sulfate-reducing bacteria.

Table 3 shows the compared density of the sulfate-reducing bacteria existing in sewage sludge from the various provinces in Korea.

TABLE 3

| Sludge sampled from | (MPN/ml) |
|---|---|
| Nanji sewage 1 | $2.8 \times 10^6$ |
| Nanji sewage 2 | $1.1 \times 10^8$ |
| Nanji septic plant | $1.1 \times 10^8$ |
| Tan-Stream sewage | $1.1 \times 10^8$ |
| Tan-Stream septic plant | $1.1 \times 10^8$ |
| Kayang sewage 1 | $1.1 \times 10^8$ |
| Kayang sewage 2 | $9.3 \times 10^6$ |
| Kayang septic plant | $4.6 \times 10^7$ |

TABLE 3-continued

| Sludge sampled from | (MPN/ml) |
|---|---|
| Keumcheon the drainage | $4.6 \times 10^7$ |
| Jungryang sewage 1 | $1.5 \times 10^7$ |
| Jungryang sewage 2 | $4.6 \times 10^7$ |
| Incineration ash | 0 |

As seen from Table 3, when seeing the resulting data of analyzing elements sampled from the sewage sludge, it was also found that relatively large amount of sulfate-reducing bacteria were contained in the sludge. However, no sulfate-reducing bacterium exists in the incineration ash.

An alternative example of the organic waste containing the sulfate-reducing bacteria includes the soil from the paddy field. The sulfate-reducing bacteria exist as mainly being a form of condensed accumulation sizing from several tens to hundreds of $\mu$m in the soil of paddy field, and exist as a form of condensed accumulation in stream bed.

Furthermore, An alternative example of the organic waste containing the sulfate-reducing bacteria includes the landfills of trash and/or wastes.

Table 4 provides the result of determining the density of sulfate-reducing bacteria existing in the trash and/or wastes filled in Nanji-do landfill.

TABLE 4

| Depth of filling-up (m) | 1 (MPN/ml) | | 2 (MPN/ml) | |
|---|---|---|---|---|
| | 30° C. | 50° C. | 30° C. | 50° C. |
| 0–6 | $1.5 \times 10^5$ | $2.1 \times 10^3$ | $7.0 \times 10^2$ | 43 |
| 6–12 | $1.5 \times 10^5$ | 40 | $1.5 \times 10^4$ | $2.4 \times 10^3$ |
| 12–18 | $1.5 \times 10^3$ | 40 | $7.0 \times 10^2$ | $7.0 \times 10^2$ |
| 18–24 | $9.3 \times 10^2$ | $7.0 \times 10^2$ | $4.6 \times 10^4$ | $1.1 \times 10^5$ |
| 24–30 | $4.3 \times 10^2$ | 90 | $1.1 \times 10^5$ | $2.4 \times 10^4$ |
| 30–36 | $2.3 \times 10^2$ | $1.5 \times 10^2$ | $2.1 \times 10^3$ | $4.6 \times 10^4$ |
| 36–42 | $7.5 \times 10^4$ | $4.3 \times 10^4$ | $2.4 \times 10^2$ | 70 |
| 42–48 | $4.3 \times 10^2$ | $2.4 \times 10^2$ | $1.5 \times 10^2$ | $4.3 \times 10^2$ |
| 48–54 | $2.4 \times 10^3$ | $1.5 \times 10^3$ | $1.5 \times 10^3$ | $2.4 \times 10^3$ |
| 54–60 | $4.3 \times 10^4$ | $4.3 \times 10^3$ | $4.6 \times 10^4$ | $9.3 \times 10^2$ |

As shown in Table 4, not a little amount of sulfate-reducing bacteria was distributed in the trash/wastes buried in Nanji-do landfill, up to $10^5$ MPN/ml. Furthermore, although not shown in Table 4, not a little amount of sulfate-reducing bacteria was also distributed in the trash/wastes from the other landfills.

Aforementioned, the reason that not a little amount of sulfate-reducing bacteria exists in the sampled trash/wastes from the landfills is that the landfills of the trash/wastes adjust the anaerobic condition, and the various kinds of organic material exist in a mass According to another aspect of the present invention, a method is provided for removing the heavy metal in the incineration ash by using the sulfate-reducing bacteria existing in the natural system with the anaerobic condition of the ecological environment, which includes the organic wastes. In other words, the present invention uses sulfur component contained in the incineration ash, and the organic material and the sulfate-reducing bacteria contained in the organic wastes, in order to treat the harmful heavy metal in the incineration ash in a stable manner.

The propagation of sulfate-reducing bacteria in the incineration ash and the reduction of sulfates may be explained by the following experiments.

Considering that the common landfills exhibit at least almost anaerobic or fully anaerobic condition with a low level of Oxidation-Reduction Potential (ORP), each 50 grams of bottom ash and fly ash and 500 ml of distilled water were introduced into a 1000 ml volume of container, and 4 g of sewage sludge were added. After reducing by use of $CO_2$ gas and sealing, the bacteria in the container were cultured at 30° C. After 2 to 3 days, ORP value was determined as being −300 mV or below, and the color was changed to red, which represents the propagation of sulfate-reducing bacteria.

Furthermore, it was reported that the addition of aqueous soil extract containing the sulfate-reducing bacteria to the incineration ash in a glass column tube promote the reduction of sulfates.

Therefore, since the sulfate-reducing bacteria can actively act in the common landfills exhibiting at least almost anaerobic or fully anaerobic condition with a low level of Oxidation-Reduction Potential (ORP), a co-treatment of the incineration ash and the sewage sludge fulfills the said condition.

As mentioned above, in a treatment of the incineration ash, the use of organic wastes as the sulfate-reducing bacteria may result in a synergic effect enabling the co-treatment of heavy metal as well as organic material in the organic wastes. Furthermore, it is possible to increase the ratio of removing the heavy metals in the incineration ash by the anaerobic condition formed by the sulfate-reducing bacteria as well as the other kinds of bacteria existing in the organic wastes and decomposing the organic compounds. Furthermore, the organic wastes themselves can also be stabilized due to the active anabolism of sulfate-reducing bacteria.

In other words, in case that the incineration ash (sulfates+ heavy metal) and the organic wastes (organic material+ sulfate-reducing bacteria) containing the sulfate-reducing bacteria are co-treated, an effect of insolubilizing the heavy metal and removing the organic material may result, and it may be applied to the treatment of a hardly decomposing organic material or the wastewater containing the heavy metal and the wastewater sludge.

BEST MODE FOR CARRYING OUT THE INVENTION

Hereinafter, a novel method according to the present invention will be described in detail by the examples for land-filling the incineration ash containing the heavy metal and the wastewater sludge, which comprises the first steps of removing the organic materials together with heavy metals, recovering the heavy metals, and using the conventional structure for utilizing the sulfate-reducing bacteria in the burying plant according to the reasonable plan in consideration of the properties of mutual relation between the bacteria and landfill.

Example 1 according to the method of the invention for treatment of the incineration ash provides a filling-up structure of landfill, which comprises: the first layer including the incineration ash and sewage sludge, and another layer covering the first layer with soil.

Figure 6:
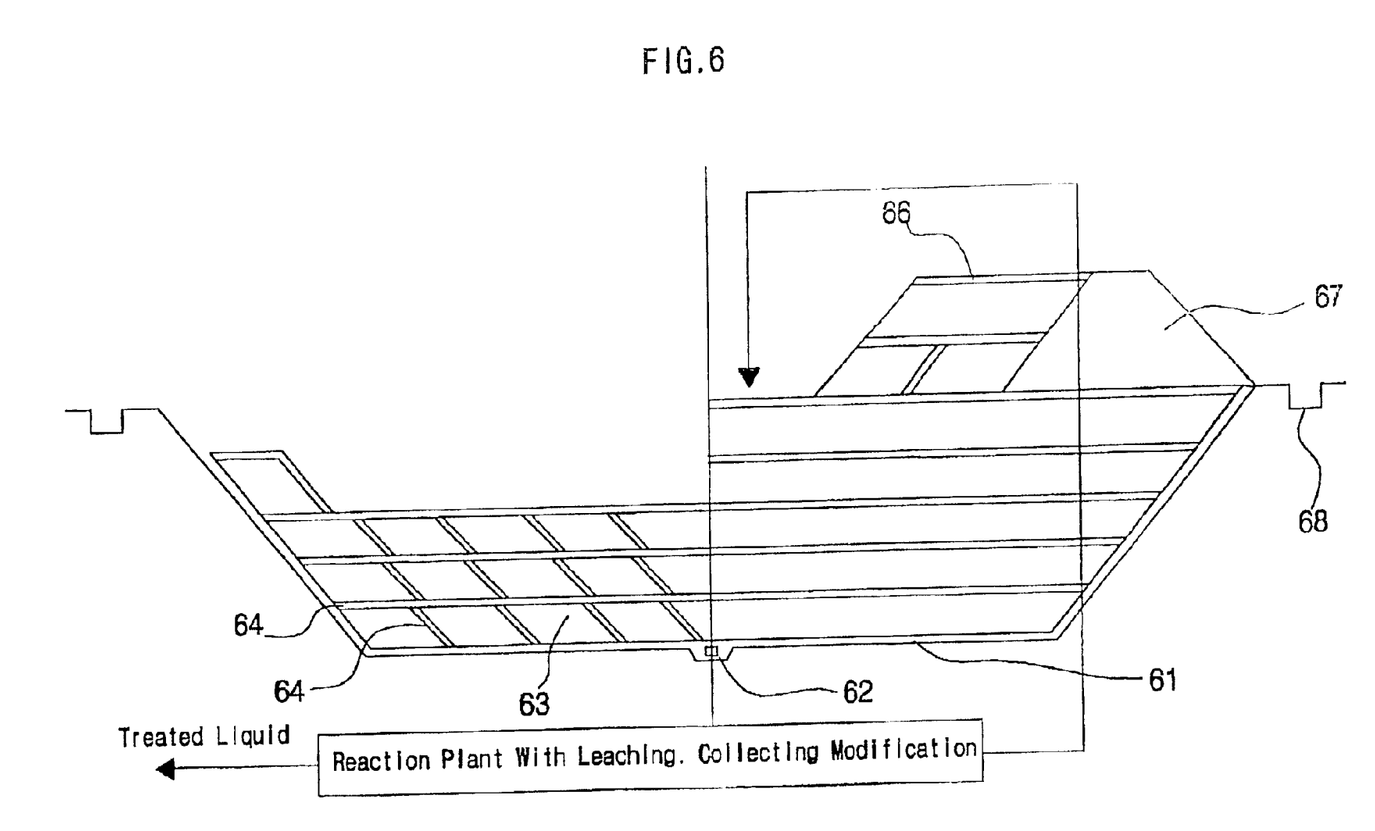
FIG. 6 schematically shows the process of Example 1 for carrying out the method for treatment of the incineration ash according to the invention.

FIG. 6 schematically shows the process of Example 1 for carrying out the method for treatment of the incineration ash according to the invention.

As shown in the drawings, below portion of the filling-up structure of landfill is provided a waterproofing barrier(61) and a drainage net system of leachate(62), and such units of the filling-up structure(63) are arranged to comprise the repeated layers. Each unit of the filling-up structure(63) should be covered by the layer of covering soil(64).

As seen from FIGS. 7a to 7d, the units of the filling-up structure(63) may be constructed in the various manner of accumulating or mixing the incineration ash and sewage sludge.

Figure 7A:
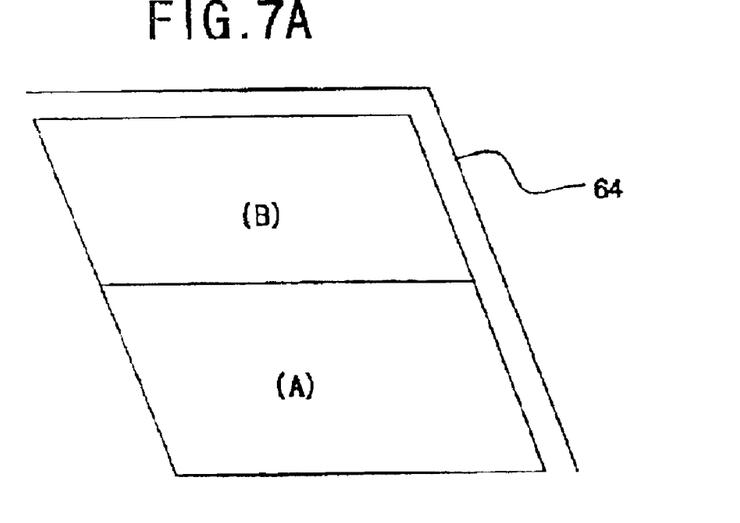
FIGS. 7a to 7d provide the explanation of the types of the unit stacks buried in the landfill.
Figure 7B:
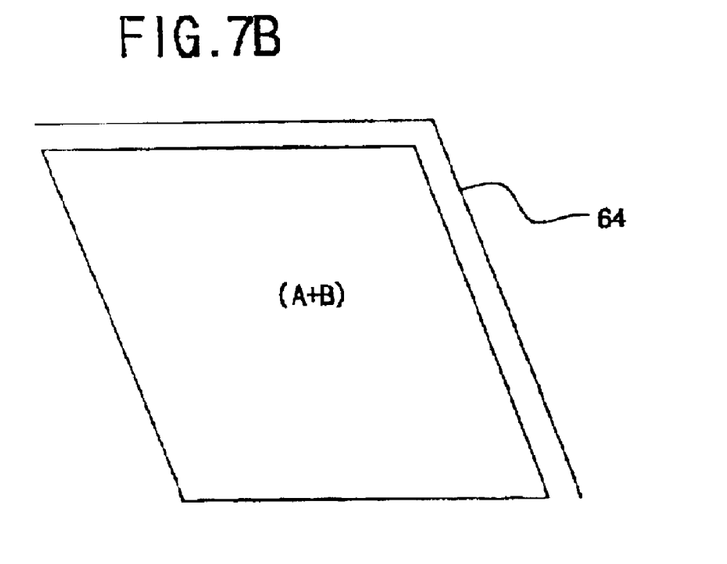
Figure 7C:
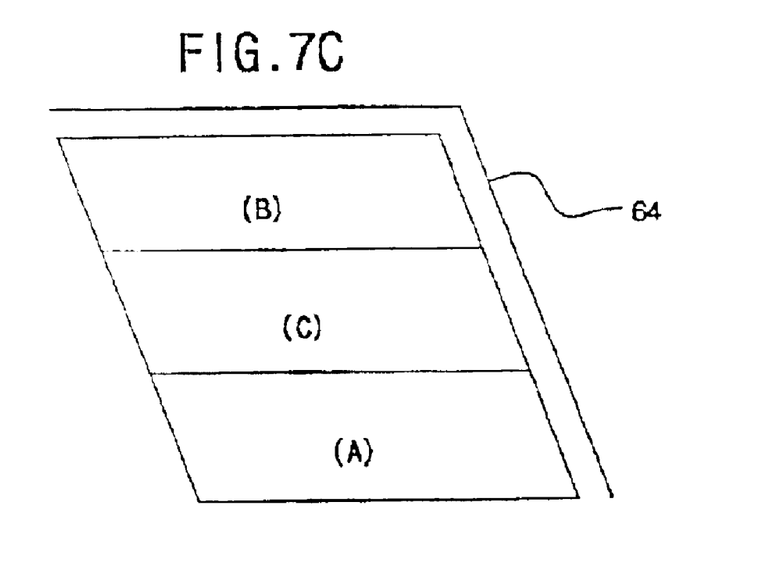
Figure 7D:
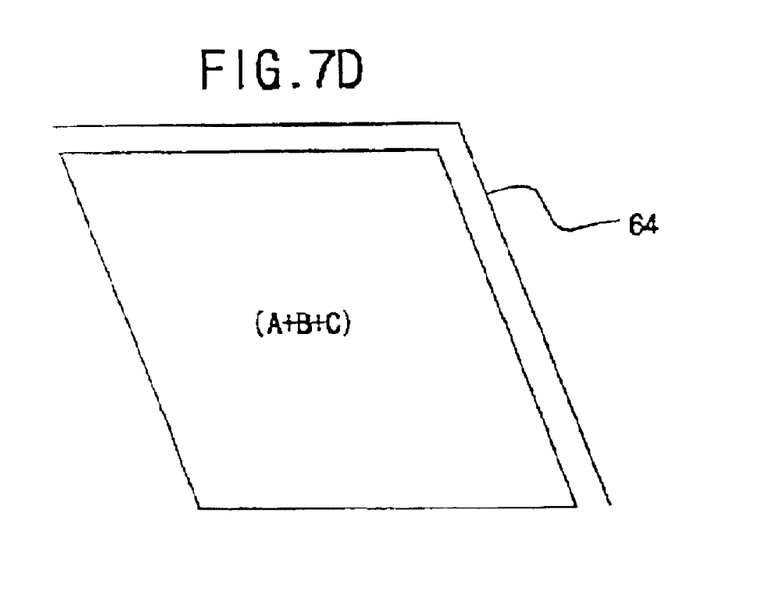

For instance, as seen from FIG. 7a, after filling up the sewage sludge (A), the incineration ash (B) is filed up on the first layer, and the layer of covering soil (64) may be covered; as seen from FIG. 7b, after filling up the mixed trash (A+B) comprising the sewage sludge (A) and the incineration ash (B), the layer of covering soil (64) may be covered; as seen from FIG. 7c, after filling up the sewage sludge (A), the city trash (C) and the incineration ash (B) are sequentially filed up on the first layer, and the layer of covering soil (64) may be covered, or as seen from FIG. 7d, after filling up the mixed trash (A+B+C) comprising the sewage sludge (A), the incineration ash (B) and the city trash (C), the layer of covering soil (64) may be covered.

The filling-up structure of landfill having the predetermined size may be formed by the repeated work for constructing the units of filling-up structure (63). On the upper end of the filling-up structure in landfill, the final layer of covering soil (66) is laid. The reference number 67, which was not explained, indicates a bank supporting such filling-up structure of landfill, and the reference number 67 indicates the drainage for flowing out the rainwater.

In the filling-up structure of landfill, the other portions of the plant except those for filling-up may follow the general standard required for filling-up industry.

As aforementioned, in a unit of the filling-up structure (63), the sulfate-reducing bacteria in the sewage sludge convert the sulfate ($SO_4^{-2}$) into the sulfides ($S^{-2}$) using the energy produced during the anabolism of the bacteria which utilize the organic material in the sewage sludge, and the sulfides ($S^{-2}$) binds to the heavy metal in the incineration ash to form a insoluble metal sulfides in a solid form. Therefore, the heavy metal in the incineration ash is solidified to stable metal sulfides in the units of the filling-up structure (63). Since the components in the landfill are hardly eluded in the leachate and so forth, the heavy metals in the incineration ash can be stabilized in an insoluble form.

The remaining leachate from the sewage sludge or the city trash after the step of filling up, may be drained through the drainage net system of leachate(62) The leachate drained through the drainage net system of leachate(62) may flow out through another route, such as leachate pool or reaction chamber, or re-injected into the landfill to carry out the leachate recycling pathway, by which the effects of insolubilization and stabilization of the heavy metals in the incineration ash may be amplified by the adopted bacteria.

Figure 8A:
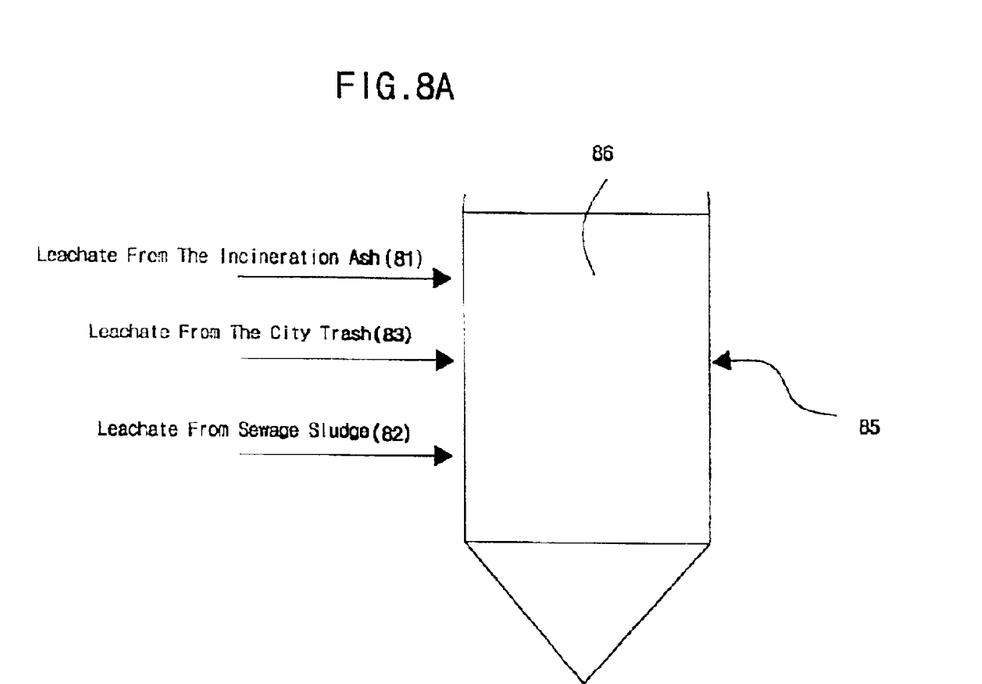
FIGS. 8a to 8c schematically show the process of Example 2 for carrying out the method for treatment of the incineration ash according to the invention.
Figure 8B:
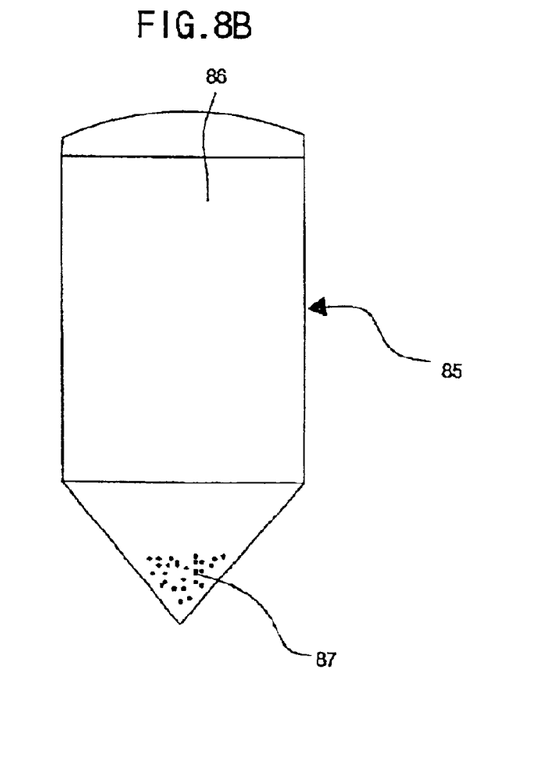
Figure 8C:
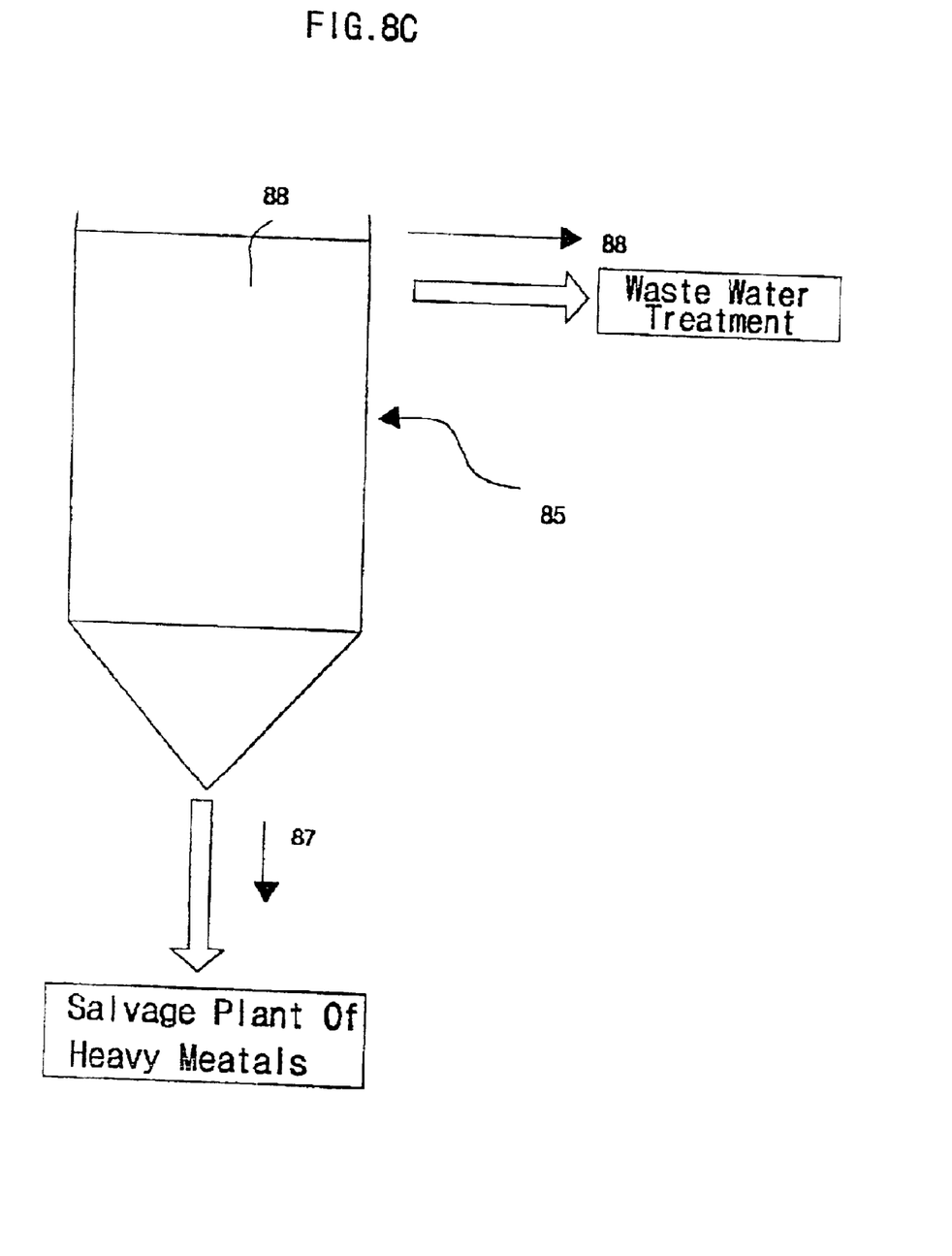

FIGS. 8a to 8c schematically show the process of Example 2 for carrying out the method for treatment of the incineration ash according to the invention.

Example 2 provides a method for treatment of leachate from the landfills in which the incineration ash, the city trash and the sewage sludge have been separately filled up, by treating them with the anaerobic condition.

Referring to FIG. 8a, the leachate (81) from the region of the incineration ash and the leachate (82) from the region of the sewage sludge in the landfill are collected in one reaction plant (85). To this, the leachate (83) from the region of the city trash may also be added for using the sulfate-reducing bacteria from the region of the city trash.

The reference number 86, which was not explained, indicates the mixture of each leachate from the incineration ash, the sewage sludge and the city trash.

Referring to FIG. 8b, in the mixture (86) in the reaction plant (85), the heavy metals existing in the leachate from the incineration ash may be precipitated by the action of sulfate-reducing bacteria in the sewage sludge. The mechanism of such reaction was aforementioned Referring to FIG. 8c, the precipitated heavy metal (87) and the remaining reaction product (88) are separately drained out and treated. In this stage, since the precipitated heavy metal (87) may be recovered through the additional apparatus for recovering the heavy metal, an advantage of the possible re-use of resources may be accomplished. Furthermore, since the reaction production may contain an amount of the sulfate-reducing bacteria adopted to the anaerobic condition, it may be reused in the process for treatment of the incineration ash.

INDUSTRIAL APPLICABILITY

The present invention enables the conversion of heavy metals in the incineration ash into the stable metal sulfides in the form of insolubilized precipitates, thereby significantly reducing the possibility of contaminating the surrounding soils and underground water caused by the elution of heavy metals during the treatment of incineration ash. Furthermore, in case that an organic waste such as the sewage sludge which contains the sulfate-reducing bacteria as the sulfate-reducing microorganism source, a synergic effects for treating the heavy metals existing in the sludge may also be expected. Moreover, another kinds of bacteria existing in the waste sludge besides the sulfate-reducing bacteria may amplify the effect for removing the heavy metals from the incineration ash. Such active metabolism of the sulfate-reducing bacteria can effectively promote the stabilization of sewage sludge.

The invention can solve the problems related to the treatment and disposal of the large amount of waste sludge and incineration ash, by the method according to the invention for treating the incineration ash containing the heavy metal and the wastewater sludge, which makes the heavy metal existing in the incineration ash insoluble and results in the stabilization of organic material by burying them in the conventional structure for burying plant according to the reasonable plan in consideration of the properties of mutual relation between them.

Furthermore, although it was difficult for securing a region suitable for using as the landfills and much cost were consumed under the circumstance of the prior arts, it is the advantage of the invention that it may not be difficult any more for securing the region for using as the landfills, and not much costs are required for the process, due to filling up the incineration ash together with city trash.

Although the present invention have specifically been described by way of the detailed examples, it is not intended to limit the spirit and scope of the invention within those description, and the skilled man in the art will be able to embody the various changes without departing from the scope of the invention as described in the specification and claimed in the attached claims.

What is claimed is:

1. A method of treating incineration ash and wastewater sludge, wherein a mutual relation in using nutrients exists between the incineration ash containing heavy metal and organic wastes containing the wastewater sludge and sulfate-reducing bacteria, comprising the steps of:

burying the incineration ash together with the organic wastes under the ground, whereby the bacteria reduces the sulfates existing in the incineration ash to form sulfides;

binding the formed sulfides with the heavy metal to form insoluble metal sulfides, thereby preventing the heavy metal from exuding out of the incineration ash as an eluate.

2. The method for treatment of the incineration ash and the wastewater sludge as claimed in claim 1, wherein the said organic wastes comprise sewage sludge containing said sulfate-reducing bacteria.

3. A method for the treatment of incineration ash and wastewater sludge, comprising: burying the incineration ash containing heavy metal together with organic wastes containing sulfate-reducing bacteria under the ground as an accumulation, and covering them with a depth of soil so that said sulfate-reducing bacteria promote the heavy metal to precipitate in the form of dissoluble metal sulfides, whereby the heavy metal is prevented from exuding out of the incineration ash as an eluate.

4. The method for the treatment of the incineration ash and the wastewater sludge as claimed in claim 3, comprising two or more unit stages of the buried accumulation, each of which includes the incineration ash and the organic wastes containing the sulfate-reducing bacteria, said accumulations being constructed in a predetermined pattern of arrangement, and the depth of covering soil forming a barrier which defines a boundary between said unit stages of buried accumulation.

5. The method for treatment of the incineration ash and the wastewater sludge as claimed in claim 3 or 4, wherein said organic wastes comprise sewage sludge containing the said sulfate-reducing bacteria.

6. A method for the treatment of incineration ash and wastewater sludge, comprising the steps of:

collecting and mixing aqueous eluate exuded from the incineration ash and aqueous eluate exuded from organic waste containing sulfate-reducing bacteria, in a disposal plant; and reacting both of the aqueous elutes so that the sulfate-reducing bacteria existing in the aqueous eluate exuded from organic waste containing sulfate-reducing bacterial, in a disposal plant; and reacting both of the aqueous elutes so that the sulfate-reducing bacteria existing in the aqueous eluate exuded from the organic waste deposits heavy metals from the aqueous eluate exuded from the incineration ash as insoluble metal sulfides, which results in the disposal of the aqueous eluate exuded from the incineration ash and the aqueous eluate exuded from the organic waste.

7. The method for the treatment of the incineration ash and the wastewater sludge as claimed in claim 6, wherein the organic wastes comprises wastewater sludge containing said sulfate-reducing bacteria.

8. The method for treatment of the incineration ash and the waste as claimed in claim 6, wherein a portion of the precipitated insoluble metal sulfides is extracted and only the heavy metals are subsequently recovered.

\* \* \* \* \*